United States Patent
Tanahashi et al.

(10) Patent No.: US 10,053,161 B2
(45) Date of Patent: Aug. 21, 2018

(54) VEHICLE

(71) Applicant: TOYOTA JIDOSHA KABUSHIKI KAISHA, Toyota-shi, Aichi-ken (JP)

(72) Inventors: Toshio Tanahashi, Susono (JP); Yoji Kanehara, Nagoya (JP); Koshi Yamada, Odawara (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 119 days.

(21) Appl. No.: 15/088,715

(22) Filed: Apr. 1, 2016

(65) Prior Publication Data

US 2016/0288844 A1 Oct. 6, 2016

(30) Foreign Application Priority Data

Apr. 3, 2015 (JP) ................. 2015-076643

(51) Int. Cl.
*B62D 37/02* (2006.01)

(52) U.S. Cl.
CPC .................... *B62D 37/02* (2013.01)

(58) Field of Classification Search
CPC ............................... B62D 37/02; B62D 35/00
USPC ........................................... 296/180.1, 180.5
See application file for complete search history.

(56) References Cited

U.S. PATENT DOCUMENTS

| 7,318,619 B2 * | 1/2008 | Munro | B63B 1/36 |
| | | | 114/67 R |
| 7,735,910 B2 * | 6/2010 | Ramsay | B60J 7/22 |
| | | | 180/903 |
| 2008/0122252 A1 * | 5/2008 | Corke | B62D 35/00 |
| | | | 296/180.2 |
| 2016/0108868 A1 * | 4/2016 | Tanahashi | F02M 35/10321 |
| | | | 123/184.61 |
| 2016/0177811 A1 * | 6/2016 | Tanahashi | B60K 11/04 |
| | | | 123/41.55 |
| 2016/0185310 A1 * | 6/2016 | Tanahashi | B60J 10/72 |
| | | | 361/217 |
| 2016/0186639 A1 * | 6/2016 | Tanahashi | F01N 13/16 |
| | | | 361/217 |
| 2016/0186703 A1 * | 6/2016 | Tanahashi | F02M 35/024 |
| | | | 123/184.21 |
| 2016/0192463 A1 * | 6/2016 | Tanahashi | B60K 13/02 |
| | | | 361/216 |
| 2016/0264192 A1 * | 9/2016 | Tanahashi | B62D 37/02 |
| 2016/0280162 A1 * | 9/2016 | Yamada | B62D 35/00 |

(Continued)

FOREIGN PATENT DOCUMENTS

| JP | 2002-011834 A | 1/2002 |
| JP | 2002-104106 A | 4/2002 |
| JP | 2002-309481 A | 10/2002 |

(Continued)

*Primary Examiner* — Jason S Morrow
(74) *Attorney, Agent, or Firm* — Hunton Andrews Kurth LLP

(57) ABSTRACT

A vehicle is provided in which separation of positively charged airflow from a positively charged surface of a vehicle body can be prevented. A vehicle body is insulated from a road surface, and positive static charges accumulate on the vehicle body during propulsion. The vehicle comprises an ionizing material that is charged negatively during propulsion to decrease the positive potential of a separation point at which positively charged airflow flowing along a vehicle surface deviates therefrom during propulsion.

7 Claims, 4 Drawing Sheets

(56) References Cited

U.S. PATENT DOCUMENTS

2016/0288844 A1\* 10/2016 Tanahashi .............. B62D 37/02

FOREIGN PATENT DOCUMENTS

| JP | 2006-088880 A | 4/2006 |
| --- | --- | --- |
| JP | 2008-143476 A | 6/2008 |
| JP | 2010-179829 A | 8/2010 |
| WO | 2015/064195 A1 | 5/2015 |

\* cited by examiner

VEHICLE

The present invention claims the benefit of Japanese Patent Application No. 2015-076643 filed on Apr. 3, 2015 with the Japanese Patent Office, the disclosure of which are incorporated herein by reference in its entirety.

BACKGROUND

Field of the Invention

Embodiments of the present invention relates to the art of an automobile.

Discussion of the Related Art

JP-A-2006-88880 describes a vehicle in which a silicon rubber sheet having an uneven surface is attached to a surface of a vehicle body to prevent airflow separation from the surface of the vehicle body. JP-A-2002-104106 describes an industrial vehicle in which a conductive non-woven fabric to cause corona discharge is attached to an outer surface of the vehicle.

However, the silicon rubber sheet having an uneven surface taught by JP-A-2006-88880 may cause disfigurement of a vehicle if attached to a vehicle surface. In addition, the silicon rubber sheet may be electrostatically charged easily during propulsion of the vehicle. Consequently, air may be separated from the sheet attached to the vehicle surface by repulsive force acting between the ionized air and a static electricity on the sheet.

The conductive non-woven fabric taught by JP-A-2002-104106 may also cause disfigurement of a vehicle if attached to a vehicle surface. In addition, if the non-woven fabric is attached entirely to the vehicle surface, air may not be separated from a desired site of the vehicle body and hence desired aerodynamic characteristics of the vehicle may not be achieved. Consequently, driving performance of the vehicle may be degraded.

SUMMARY

Aspects of embodiments of the present invention have been conceived noting the foregoing technical problems, and it is therefore an object of embodiments of the present invention to provide a vehicle which can prevent separation of positively charged airflow from a positively charged surface of a vehicle body during propulsion.

During propulsion of the vehicle, positive static charges accumulate on a vehicle body insulated from a road surface. In order to achieve the above-explained objective, the vehicle according to embodiments of the present invention is provided with an ionizing material that is charged negatively during propulsion to decrease the positive potential of a separation point at which positively charged airflow flowing along a vehicle surface deviates therefrom during propulsion.

The ionizing material is formed in such a manner that a length thereof in the flowing direction of the airflow is longer than a width thereof.

For example, the ionizing material may be integrated with the separation point.

The separation point may be formed of resin material. In this case, the ionizing material may be integrated with the separation point.

The vehicle further comprises an inner panel extending along an inner surface of the vehicle body while keeping a predetermined distance, and the ionizing material may be integrated with the inner panel.

For example, resin material may be used as the ionizing material.

The ionizing material may also be mixed with coating material applied to the separation point.

Thus, according to embodiments of the present invention, the vehicle is provided with the ionizing material that is charged negatively during propulsion to decrease the positive potential of a separation point at which positively charged airflow flowing along a vehicle surface deviates therefrom during propulsion. According to embodiments of the present invention, therefore, repulsive force acting between the positively charged airflow and the positively charged vehicle surface can be reduced to prevent separation of the airflow from the vehicle surface during propulsion of the vehicle. For this reason, desired aerodynamic characteristics of the vehicle can be ensured to improve a traveling stability of the vehicle.

BRIEF DESCRIPTION OF THE DRAWINGS

Features, aspects, and advantages of exemplary embodiments of the present invention will become better understood with reference to the following description and accompanying drawings, which should not limit the invention in any way.

FIG. 1b is a top view of the ionizing material shown in FIG. 1a;

DETAILED DESCRIPTION OF THE PREFERRED EMBODIMENTS

Figure 5:
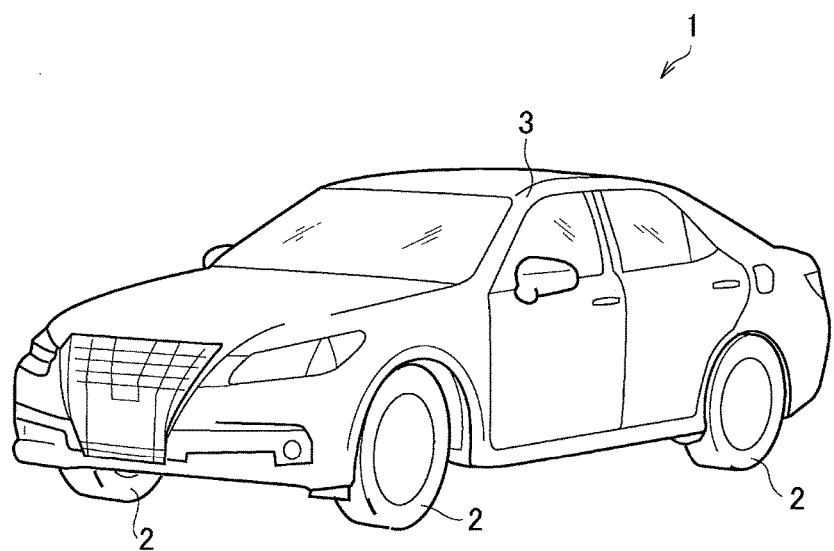
FIG. 5 is a perspective view showing one example of a vehicle to which an embodiment of the present invention is applied.

Referring now to FIG. 5, there is shown one example of a vehicle to which an embodiment of the present invention is applied. In the vehicle 1, a tire made of insulating material whose electrical conductivity is small, such as rubber, is individually mounted on each wheel 2 to insulate a vehicle body 3 from a road surface. During propulsion of the vehicle 1, positive static charges may accumulate on a body 3 for a variety of reasons, e.g., friction between a surface of the body 3 and external airstream or friction between an air duct and air flowing therethrough. The positive static charges may also accumulate on the body 3 due to friction between slidable members of a prime mover such as an engine and a motor, a transmission, a suspension etc. The positive static charges may also accumulate on the body 3 due to friction between the tire and the road surface, and an electrical spark resulting from detachment of the tire from the road surface. In addition, the positive static charges may also accumulate on the body 3 due to electrical activity of electrical equipment and an influence of external electrical cables etc.

Static electricity may also accumulate on other parts of the body and panels made of material of relatively high electrical conductivity due to electrical resistance at a joint portion.

Figure 6:
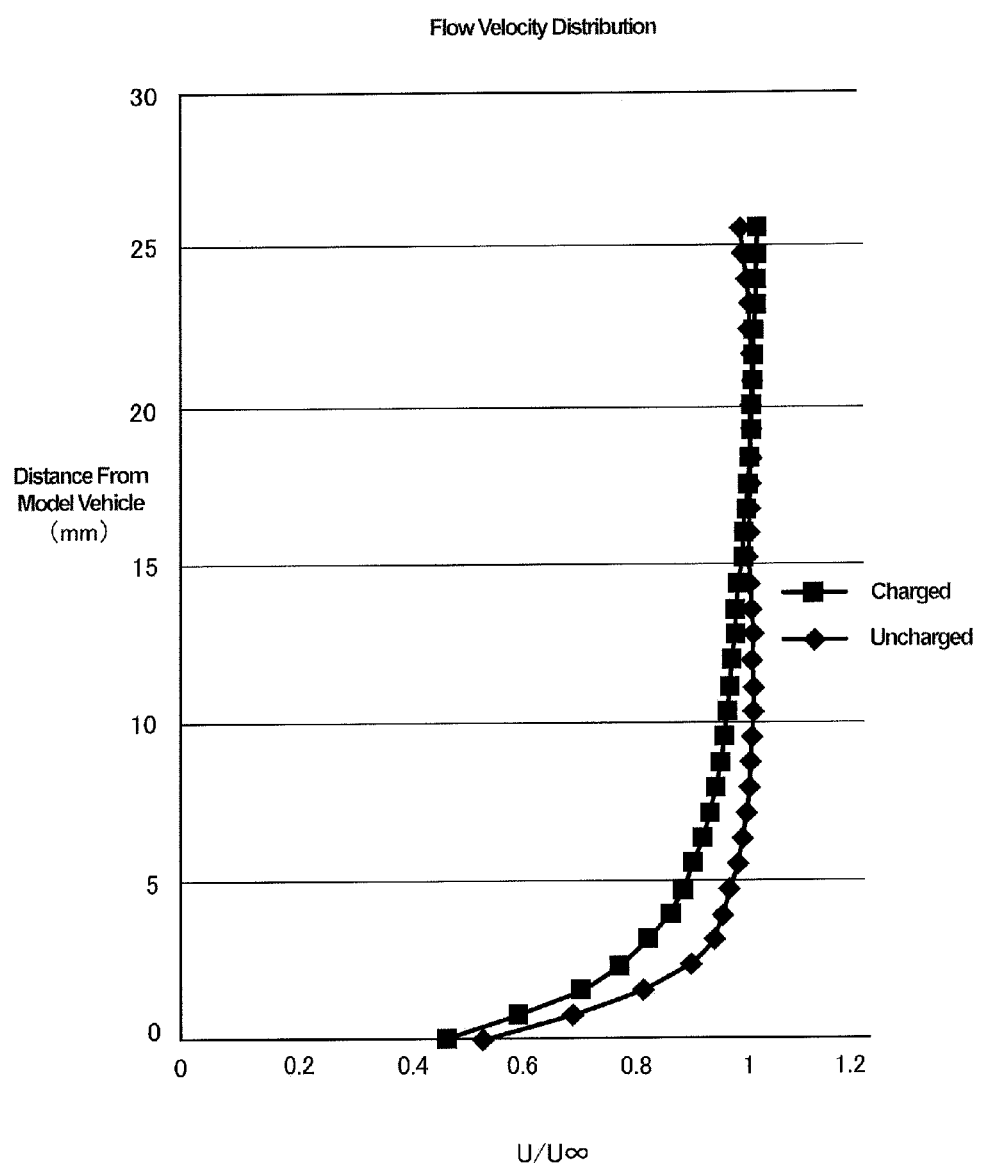
FIG. 6 is a graph indicating measurement results of flow velocity distributions in a direction perpendicular to a surface of a model vehicle.

Air is charged positively and hence repulsive force acts between the air and the body 3 on which the positive charges accumulate. Turning to FIG. 6, there are shown measurement results of flow velocity distribution in a direction perpendicular to a positively charged surface of a model vehicle, and flow velocity distribution in a direction perpendicular to an uncharged surface of a model vehicle. In FIG. 9, the vertical axis represents a distance from the surface of the model vehicle, and the horizontal axis represents a ratio of a flow velocity U of the air flowing on the surface of the model vehicle to a flow velocity U∞ measured from a predetermined distance (U/U∞). Square dots represent measured values of flow velocity of the air flowing on the positively charged surface of the model vehicle, and rhombus dots represent measured values of flow velocity of the air flowing on the uncharged surface of the model vehicle.

As can be seen from FIG. 6, a thickness of a boundary layer (i.e., a distance from the vehicle surface at which the ratio U/U∞ is substantially zero) of the case in which the surface of the model vehicle is positively charged is thicker than that of the case in which the surface of the model vehicle is not charged. This means that the airflow is isolated further away from the positively charged surface of the model vehicle in comparison with the case in which the surface is not charged. This is because the airflow is charged positively and hence the positively charged airflow and the positively charged surface of the vehicle repel each other.

During propulsion of the vehicle 1, the airflow flowing along the surface of the body 3 have a tendency to deviate from the surface of the body 3 at specific points. Specifically, the airflow deviates from the surface of the body 3 at a portion where the body 3 is bent inwardly or protruded outwardly. For example, the airflow has a tendency to deviate from the surface of the body 3 at depressions on a bonnet, a roof, and side members. In addition, the airflow also deviates from an outer surface of an undercover at corners between a downwardly slanted plate and a flat plate, and between the flat plate and an upwardly slanted plate. Those points at which the airflow deviates from the surface of the body 3 will be called the "separation point" in the following description and claims.

The airflow is attracted to the surface of the body 3 by Coanda effect in accordance with a speed difference between the airflow and the vehicle body 3 even at the above-mentioned separation points. However, given that the body 3 is charged positively, the positively charged airflow is repelled therefrom. In order to avoid such separation of the airflow from the vehicle body, according to the preferred example, the separation points were determined by an experiment that took place in a wind tunnel, and the positive potential of the specified separation point is decreased or the separation point is charged negatively by an ionizing material attached thereto.

Figure 1A:
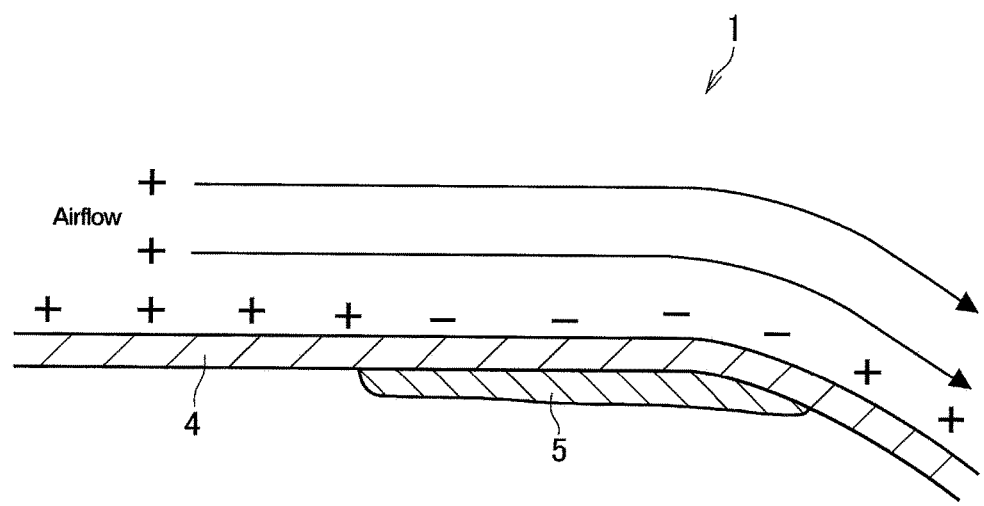
FIG. 1a is an explanatory illustration showing an ionizing material according to the preferred example attached to an inner face of the vehicle.
Figure 1B:
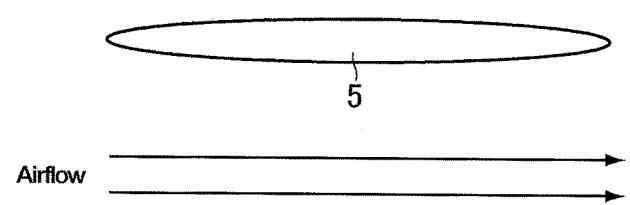

Turning to FIG. 1a, there is shown a cross-section of the ionizing material 5. In the vehicle 1, an upstream side of a panel 4 is formed into a flat wall but a downstream side thereof is curved inwardly to form the above-mentioned separation point. According to the preferred example, the ionizing material 5 is attached to an inner face of the panel 4 to prevent a separation of the airflow from an outer surface of the panel 4. The ionizing material 5 is adapted to be charged with the negative potential by an external factor during propulsion of the vehicle 1, and for example, coating material containing tourmaline powder, acrylic resin, polyester resin and so on may be used to form the ionizing material 5. As illustrated in FIG. 1b, it is preferable to form the ionizing material 5 in such a manner that a length of the ionizing material 5 in the flowing direction of the airflow is longer than a width thereof. In other words, a longitudinal length of the ionizing material 5 in a flowing direction of the airflow is longer than that of the width thereof.

Alternatively, the ionizing material 5 may also be arranged on the outer surface of the vehicle body 3. For example, the ionizing material 5 may be mixed with coating material applied to the outer surface of the vehicle body 3 or a base coat. In this case, the ionizing material 5 may be applied to the separation point without causing disfigurement of the vehicle 1.

During propulsion of the vehicle 1, the vehicle body 3 is charged positively but the ionizing material 5 is charged negatively so that the positive potential of the separation point is decreased by the ionizing material 5 and eventually charged with the negative potential. In this situation, the potential of the separation point is governed by a difference from the negative potential of the ionizing material 5. According to the preferred example, the repulsive force acting between the positively charged airflow and a portion of the panel 4 in the vicinity of the separation point can be reduced by reducing the positive potential of the separation point by the ionizing material 5 even if the separation point is still charged negatively. Then, after the potential of separation point is turned negative, the airflow will be attracted to the outer surface of the panel 4 by Coulomb force.

Thus, according to the preferred example, separation of the airflow from the outer surface of the vehicle body 3 can be prevented to ensure desired aerodynamic characteristics of the vehicle 1. That is, deterioration in aerodynamic characteristics of the vehicle 1 in the rolling direction and the yawing direction can be prevented. In addition, since the ionizing material 5 can be arranged without changing a surface figure of the vehicle body 3, deterioration in aerodynamic characteristics of the vehicle 1 can be prevented without causing disfigurement of the vehicle 1.

Figure 2:
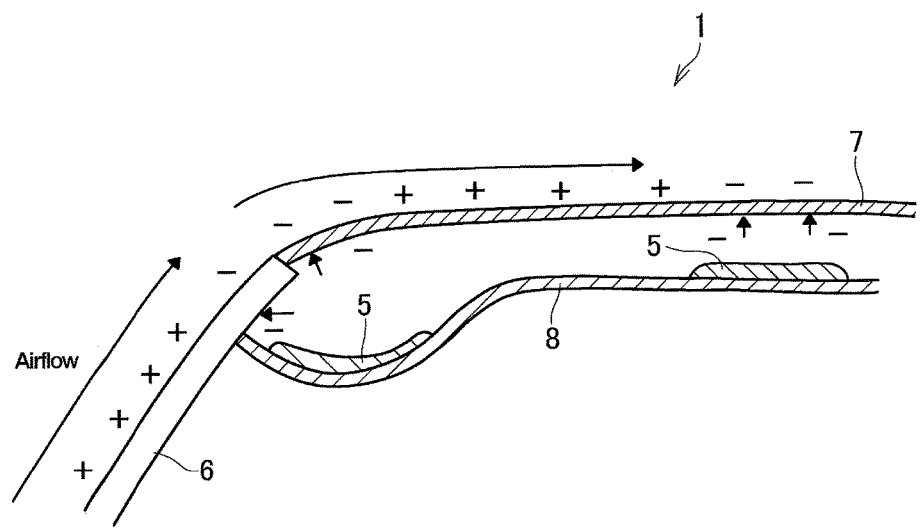
FIG. 2 is a cross-sectional view showing the ionizing material attached to an inner panel.

According to another example, the ionizing material 5 may be arranged while keeping a distance from the separation point as illustrated in FIG. 2. Specifically, another example shown in FIG. 2 is configured to prevent separation of the airflow from a windshield 6 and a roof 7. In the vehicle 1 shown therein, a leading end of the roof 7 is bent downwardly to be connected to the windshield 6, and hence the airflow flowing from the windshield 6 toward the roof 7 has a tendency to deviate from an outer surface of the curved portion of the roof 7. According to the example shown in FIG. 2, a plurality of the ionizing materials 5 are disposed on an inner surface of an inner panel 8 extending from an upper edge of an inner surface of the windshield 6 along the roof 7 while keeping a distance to an inner surface of the roof 7.

In order to effectively prevent such separation of the airflow, specifically, one of the ionizing materials 5 is disposed on the inner surface of the inner panel 8 in the vicinity of the upper edge of the inner surface of the windshield 6, and the other ionizing material 5 is disposed on the inner surface of the inner panel 8 at a center of the inner panel 8 in both lengthwise and widthwise directions.

If the separation of airflow is caused at a front side of the vehicle 1, downforce applied to front wheels is weakened thereby decreasing vehicle 1, downforce applied to front wheels is weakened thereby decreasing control stability. In order to avoid such a disadvantage, it is further preferable to arrange a plurality of the ionizing materials 5 on the inner surface of the inner panel 8 along the upper edge of the inner surface of the windshield 6 at predetermined intervals in the width direction.

Figure 3:
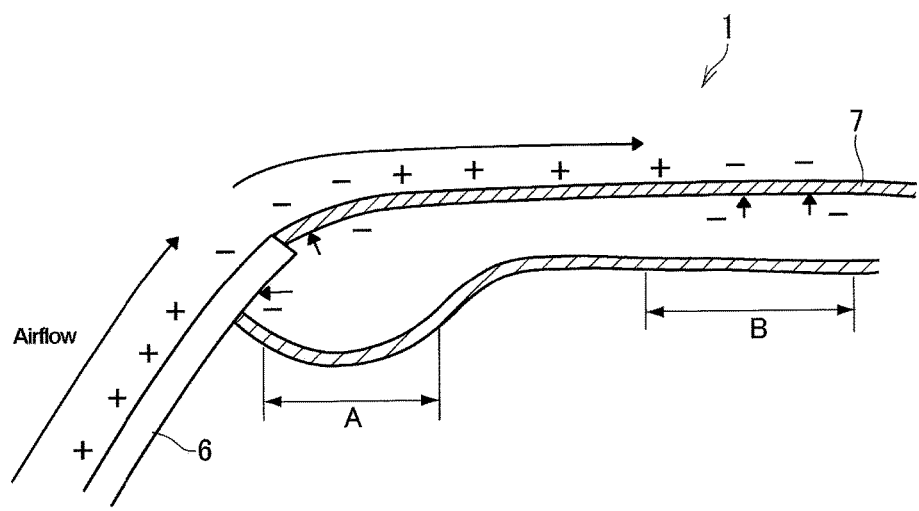
FIG. 3 is a cross-sectional view showing the inner panel formed integrally with the ionizing material.

The ionizing material 5 may also be formed integrally with the inner panel 8. For example, the resin material of the ionizing material 5 may be mixed with fiber material of the inner panel 8. FIG. 3 shows such a modification example of another example shown in FIG. 2, and in this case, the ionizing materials 5 are arranged individually within a region A and a region B.

According to the example shown in FIG. 3, the positive potential of the air existing between the separation point and the ionizing material 5 is decreased so that the air will be charged with the negative potential eventually. Consequently, the positive potential of the separation point is decreased and the separation point will be charged with the negative potential eventually. Thus, separation of the airflow from the outer surface of the vehicle body 3 may also be prevented by arranging the ionizing material 5 while keeping a distance from the inner surface of the separation point.

In addition, since the separation of the airflow from the width center of the outer surface of the roof 7 is thus prevented, turning performance and travelling stability of the vehicle 1 can be ensured. Specifically, even when the vehicle 1 making a turn receives air diagonally, the difference between downforces at the inner wheel side and the outer wheel side can be reduced to improve a turning performance of the vehicle 1.

Figure 4:
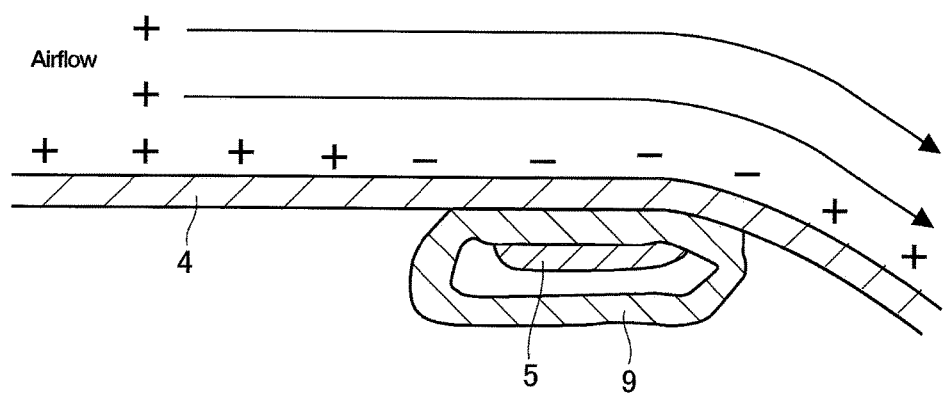
FIG. 4 is a cross-sectional view showing the inner panel held in a hollow member.

As illustrated in FIG. 4, the ionizing material 5 may also be arranged in a hollow member 9 such as a weather strip. Likewise, various modifications of the ionizing material 5 may be made within the spirit of the foregoing descriptions. For example, the ionizing material 5 may also be integrated with another member made of resin such as an undercover. In this case, the ionizing material 5 is mixed with the resin material of the other member, and shaped into a desired shape by injection molding or insertion molding. Further, the ionizing material 5 may also be arranged in the windshield 6. In this case, specifically, the ionizing material 5 may be mixed with material of an interlayer film. That is, the ionizing material 5 is interposed between glass layers.

In addition, the ionizing material 5 may also be applied to a ceramic coating covering the inner surface of the windshield 6 in the vicinity of the upper edge of the windshield 6 to be covered by a rubber packing. In order to prevent separation of airflow from a side face of the vehicle at a front pillar or a center pillar, the ionizing material 5 may also be applied to a side window. In this case, the ionizing material 5 is applied to a lower edge of the side window at which a surface treatment is not applied. That is, the ionizing material 5 is applied to a portion of the side window at which a surface is rough to avoid a separation therefrom during transportation from a glass factory and during assembly.

What is claimed is:

1. A vehicle, in which positive static charges accumulate on a vehicle body insulated from a road surface during propulsion, comprising:
    an ionizing material that is naturally charged negatively during propulsion to decrease the positive potential of a separation point at which positively charged airflow flowing along a vehicle surface deviates therefrom during propulsion.

2. The vehicle as claimed in claim 1, in which a length of the ionizing material in the flowing direction of the airflow is longer than a width thereof.

3. The vehicle as claimed in claim 1, wherein the ionizing material is integrated with the separation point.

4. The vehicle as claimed in claim 3,
    wherein the separation point is formed of resin material, and
    wherein the ionizing material is integrated with the separation point.

5. The vehicle as claimed in claim 1, further comprising:
    an inner panel extending along an inner surface of the vehicle body while keeping a predetermined distance; and
    wherein the ionizing material is integrated with the inner panel.

6. The vehicle as claimed in claim 1, wherein the ionizing material includes resin material.

7. The vehicle as claimed in claim 1, wherein the ionizing material is mixed with coating material applied to the separation point.

* * * * *